(12) United States Patent
Hennecken et al.

(10) Patent No.: US 6,339,032 B2
(45) Date of Patent: Jan. 15, 2002

(54) PRESS PAD MADE OF ASBESTOS-FREE MATERIAL

(75) Inventors: Bruno Hennecken, Aachen; Rolf Espe, Bochum, both of (DE)

(73) Assignee: Rheinische Filztuchfabrik GmbH, Stolberg/Rhld (DE)

( * ) Notice: Subject to any disclaimer, the term of this patent is extended or adjusted under 35 U.S.C. 154(b) by 0 days.

(21) Appl. No.: 08/960,135

(22) Filed: Oct. 29, 1997

(30) Foreign Application Priority Data

Oct. 30, 1996 (DE) ..................................... 296 18 864 U

(51) Int. Cl.⁷ ............................ B32B 5/26; D03D 15/00
(52) U.S. Cl. ................... 442/246; 442/189; 442/228; 442/229; 442/247; 442/268; 428/902
(58) Field of Search ................... 442/189, 228, 442/229, 246, 247, 268; 428/902

(56) References Cited

U.S. PATENT DOCUMENTS

| | | |
|---|---|---|
| 2,372,114 A | 3/1945 | Perry et al. |
| 4,461,800 A * | 7/1984 | Tanaka ...................... 428/217 |

FOREIGN PATENT DOCUMENTS

| | | | |
|---|---|---|---|
| DE | 29 20 866 A1 | 5/1979 | |
| DE | G 94 18 984.6 | 11/1994 | |
| EP | 0 493 630 A1 | 12/1990 | |
| EP | 0 488 071 A2 | 11/1991 | |
| EP | 561158 * | 9/1993 | ........... B30B/15/06 |
| EP | 0 561 158 A1 | 12/1993 | |
| EP | 0 703 069 A1 | 3/1996 | |

* cited by examiner

*Primary Examiner*—Terrel Morris
*Assistant Examiner*—Norca L. Torres-Velazquez
(74) *Attorney, Agent, or Firm*—Charles N. Quinn

(57) ABSTRACT

A molded pad of asbestos-free material, for use e.g. in short-cycle and multi-platen presses for coating chipboard or other substrates with melamine, films or other materials, consisting of woven fabric made of heat-resistant yarn, esp. aromatic polyamide (aramid), opt. combined with other yarn materials and contg. 50–98 (pref. 71–92) wt. % metal fibers (w.r.t. total wt. of pad). The novelty is that a non-woven fabric (B) is uniformly bonded with adhesive (I) to the top and/or bottom side of the woven fabric (A). Also claimed is a similar pad for use in high-pressure laminating presses, with woven fabric (esp. of aramid) as above (A) contg. 0–70 (pref. 0–40) wt. % metal fibers and with non-woven fabric (B) evenly stuck on the top and/or bottom of layer (A) with adhesive (I).

6 Claims, 1 Drawing Sheet

PRESS PAD MADE OF ASBESTOS-FREE MATERIAL

Figure 1:
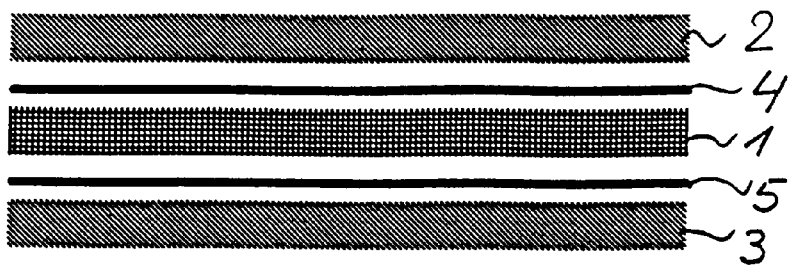

This invention pertains to a press pad made of asbestos-free material, e.g., for use in short-cycle and multiplaten presses for coating chip boards or other material.

BACKGROUND INFORMATION

Such press pads are used, in general, in various types of high- and low-pressure presses, e.g., short-cycle or multiplaten presses for coating chip boards with melamine film, high-pressure presses for manufacturing high-pressure laminates and presses for covering various types of support materials with wood veneer or films or other similar presses for surface coating.

It has been known that metal filaments can be woven into a press pad to improve its heat transfer.

Aside from this, usual press pads have as the asbestos-free material a fabric layer made of a textile fabric, whose surface is so rough and irregular that despite the interposition of a pressing plate made of metal, the surface structure may be visible on the laminate manufactured in a disturbing manner, which is felt disturbing if very high requirements are imposed on the uniformity of the surface of the laminate.

To remedy this drawback, press pads have been known with a textile fabric made of a heat-resistant yarn, especially aromatic polyamide, which may optionally be blended with other yarn materials, and which contains metal filaments in an amount between 0 and about 70 wt. % and preferably between about 0 and about 40 wt. % relative to the total weight of the press pad, in which a mat is firmly applied to the top side and/or the underside of the fabric layer (such pads are disclosed in EP 0 561 158 B1). It is specifically known in this connection that the mat is pinned onto the top side and/or the underside of the fabric layer. It is thus achieved that no disturbing marks of the press pad structure are formed on the laminate surface during pressing, not even in the case of very high requirements imposed on the surface of a laminate being manufactured in a high-pressure press.

Bonding was advised against in the past for connecting the mat to the fabric layer, because bonded areas of different density would be formed next to each other as a result. The drawback of a nonuniform heat transfer due to the nonuniform adhesive layer was feared as well.

On the other hand, it was found in practice that breakage of the needle occurs during the pinning process in various applications, especially when a higher percentage of metal is to be reached in the press pad, which makes it impossible to use percentages of metal in excess of about 70 wt. %.

THIS INVENTION

The basic object of the present invention is therefore to provide a press pad with a mat applied to it, during the manufacture of which the fastening process takes place in a reliable manner, especially without needle breakages and during the use of which no disadvantages arise in terms of a nonuniform heat transfer.

A suitable fastening technique was surprisingly found to accomplish this object by uniformly bonding a mat on the top side and/or the underside of the fabric or by uniformly bonding the mat on the fabric layer. Consequently, what is important is not the bonding per se, but uniform bonding, which can be accomplished by various techniques developed for manufacturing the press pad which make it possible to very exactly and uniformly apply an adhesive or a chemically reactively bonding layer.

Besides solving the above-mentioned problem, this fastening technique also has the advantage that the percentage of metal relative to the total weight of the pad may be selected at practically any desired value, so that this fastening technique is also suitable for pads that require a higher percentage of metal.

Specifically, the uniform adhesive layer can be applied by spraying the adhesive to the press pad or its fabric layer.

As an alternative to this, it is also possible to uniformly roll the adhesive onto the press pad or its fabric layer.

The adhesive can be metered very accurately and be applied without deposits according to both techniques.

The mat layer may be connected to the rest of the press pad by a hot-melt adhesive. These hot-melt adhesives may contain copolyamides or copolyesters as typical compounds.

However, it is also possible to prepare the adhesive bond by means of a film that is pressure-sensitive on both sides, in which case the uniformity of the bonding is guaranteed by the coating of the film.

As an alternative to this, the mat may be connected to the press pad or its fabric layer with a thermoplastic film under the action of heat.

All the above-mentioned films may the following plastics: polypropylene, polyethylene, polyvinyl acetate, polymethyl methacrylate, phenoxy resin, amino resins, and polyvinyl alcohols.

To protect the surface of the bonded mat layer from the adhesion of epoxy resin, phenol, size and other contaminants, which may occur during the production process, the outer surface of the mat layer may be provided with a surface protection layer on one side or on both sides of the press pad. The mat layer is spared by the superjacent surface layer during the intended use of this press pad, i.e. during pressing. The harmful effect of friction, which is otherwise generated as a consequence of the thermal expansion of the heating plate and of the pressing plate and expansion of the press pad leading to destructive rupture and/or powdering disintegration of the fine fibers of the mat in the long run, is thus avoided.

The surface protection layer may advantageously consist of thermoplastic metal composite foils, glass fibers, Nomex fibers or Kevlar fibers. Of these, the glass fiber, Nomex fiber or Kevlar fiber fabric may be advantageously coated with a silicone resin or with a thermoplastic that possesses good release properties from metals, duroplastic synthetic resins or thermoplastics.

It is desirable for some applications to stiffen the inherently flexible press pad, especially in order to facilitate the handling of the press pad during the production process by an individual person. This stiffening may be performed by applying at least one stiffening layer in the press pad. The stiffening layer may be arranged between the press pad or its fabric layer and the mat bonded on uniformly. The extent of stiffening can be set by selecting the stiffening layer thickness and the number of stiffening layers.

To prevent water vapor that is generated during the production process, i.e. condensate from the resin which is enriched with organic or inorganic compounds such as formaldehyde, ammonia, phenol, cresol or chloride compounds, from penetrating into the press pad, in which case such compounds may lead to a premature destruction of the fibers contained in the press pad, the press pad is provided with an edge seal after the uniform bonding of the mat layer. The edge seal may consist especially of silicone or polytetrafluoroethylene; the coating of the side edges is preferably extended into a complete coating of the press pad. The press pad is protected with the coating against contamination or from adhesion of, e.g. epoxide, phenol.

The present invention may also be used advantageously in a press pad in which the fabric (base fabric) is already pinned with mat. This applies to the case in which an existing, already pinned press pad must subsequently be provided with more mat.

Another advantage of the uniform bonding of the mat is that it can be performed without an expensive pinning device.

THE DRAWINGS

Two exemplary embodiments of the press pad according to the invention are described below on the basis of a drawing comprising two figures. In the drawings, FIG. 1 shows a pulled-apart cross-sectional view of a first exemplary embodiment of the press pad.

Figure 2:
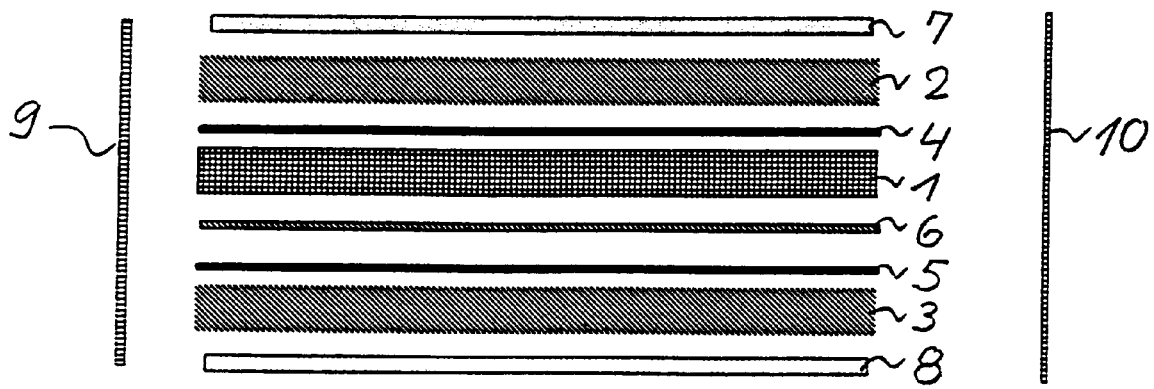

FIG. 2 shows a pulled-apart cross-sectional view of a second exemplary embodiment of the press pad.

Identical layers are designated with the same reference numbers in the two figures.

DETAILED DESCRIPTION OF THE PREFERRED EMBODIMENT AND BEST MODE KNOWN FOR PRACTICE

Reference number 1 in FIGS. 1 and 2 designates a fabric layer made of heat-resistant yarn, which has a high percentage of metal filaments, exceeding 70 wt. % here. This metallized fabric layer may also be considered to be the press pad proper.

A mat 2 and 3 each, which is also called a mat layer, is bonded by means of an adhesive layer 4 and 5, respectively, which has a uniform thickness over the surface, to both the top side and the underside of the press pad or of the fabric layer 1 in the embodiment according to FIG. 1.

In the exemplary embodiment according to FIG. 2, the mat 2 is bonded to the top side of the fabric layer 1 via an adhesive layer 4 of uniform thickness, as in the embodiment according to FIG. 1. In contrast, a stiffening layer 6 is present on the underside of the fabric layer 1. Consequently, the mat 3 is not bonded directly to the underside of the fabric layer by means of the adhesive layer 5, but it is in connection with the underside of the fabric layer 1 via the uniform adhesive layer 5 and the stiffening layer 6.

Furthermore, the outer sides of the mats 2 and 3 are protected by the surface protection layers 7 and 8, which are applied to them. The protection is completed in the area of the edges of the said layers by an edge seal 9 and 10 each, which are oriented at right angles to the said layers and tightly join the edges of the layers 1–8.

We claim the following:

1. An asbestos-free press pad of laminate construction for use in short-cycle and multi platen presses for coating support structures including chipboard with surface coating materials including melamine, comprising:

a. heat-resistant yarn having metal filaments running therethrough forming a central layer of a lamina defining said pad;

b. a pair of adhesive layers complementally contacting respective outwardly facing surfaces of said central yarn layer;

c. a pair of adhesive layers complementally contacting respective outwardly facing layers and being secured to said central yarn layer thereby;

wherein said yarn contains metal filaments in an amount of between 71 and 92 weight percent of the total weight of the pad.

2. An asbestos-free press pad of laminate construction for use in short-cycle and multi platen presses for coating support structures including chipboard with surface coating materials including melamine, comprising:

a. heat-resistant yarn having metal filaments running therethrough forming a central layer of a lamina defining said pad and having a pair of oppositely facing outer surfaces;

b. a stiffening layer complementally contacting a first outer surface of said yarn layer c. a pair of adhesive layers positioned outboard of respective outer surfaces of said yarn layer, one of said adhesive layers complementally contacting a second outer facing surface of said yarn layer and a remaining one of said adhesive layers complementally contacting a surface of said stiffening layer facing away from said yarn layer;

a. a pair of mat layers, one of said mat layers contacting an outer surface of said adhesive layer contacting said heat resistant yarn and a remaining mat layer contacting an outer surface of said adhesive layer contacting said stiffener;

b. a pair of surface protection layers contacting outer surfaces of respective ones of said mat layers; and c. a pair of edge seals running between and being bonded to said surface protection layers on respective edges of a lamina defined by said yarn, said stiffening layer, said adhesive layer, said mat and said surface protection layer, contacting respective exposed edges of said yarn, stiffening, adhesive, mat and surface protection layers.

3. The press pad of claim 2 wherein said yarn contains metal filaments in an amount of between 50 and 98 weight percent of the total weight of the pad.

4. The press pad of claim 2 wherein said yarn contains metal filaments in an amount of between 71 and 92 weight percent of the total weight of the pad.

5. The press pad of claim 2 wherein said yarn contains metal filaments in an amount of between 0 and 70 weight percent of the total weight of the pad.

6. The press pad of claim 2 wherein said yarn contains metal filaments in an amount of between 0 and 40 weight percent of the total weight of the pad.

* * * * *